Feb. 5, 1952    H. S. ALEXANDER    2,584,245
DEVICE FOR SUPPORTING TRANSPARENT
STEREOSCOPIC SLIDES
Filed Nov. 16, 1949
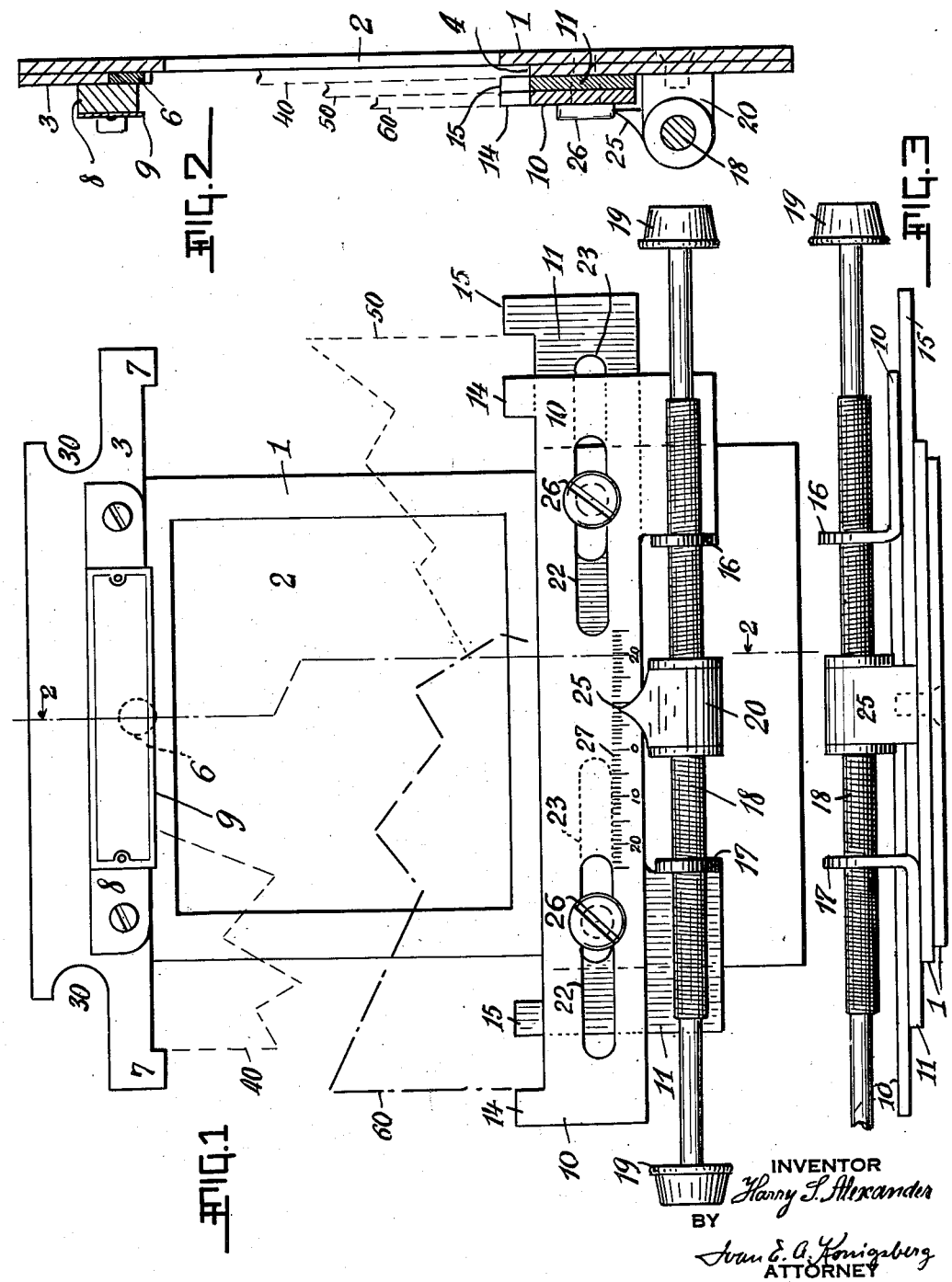
INVENTOR
*Harry S. Alexander*
BY
*Ivan E. A. Konigsberg*
ATTORNEY Patented Feb. 5, 1952

2,584,245

UNITED STATES PATENT OFFICE 2,584,245

DEVICE FOR SUPPORTING TRANSPARENT STEREOSCOPIC SLIDES

Harry S. Alexander, Meadville, Pa., assignor to Keystone View Company, Meadville, Pa., a corporation of Pennsylvania Application November 16, 1949, Serial No. 127,686

1 Claim. (Cl. 88—20)

The object of this invention is to provide an improved device for supporting and operating a stereoscopic three-slide assembly for use in binocular vision training. The slides may be viewed directly by means of the device or the latter may be mounted on a stereoscopic or other vision training instrument. Another object is to provide a slide supporting and operating device of very simple efficient design and construction.

In the drawing illustrating the invention

Fig. 1 is a front view of the device.

Fig. 2 is a sectional view taken on the line 2—2 of Fig. 1.

Fig. 3 is a bottom view.

The device is constructed to support three stereoscopic or other slides in superposed relation. The two front slides are movable in opposite directions and may be stereoscopic complements, one of the other. The third rear slide is immovable and may bear some pictorial representations having optical relation to the two front slides, or the third slide may be a plain glass plate.

The device comprises a back plate 1 having a view opening 2 framed therein. At the top there is a projecting portion 3 and in line therewith there is a ledge 4 at the bottom of the opening 2. A third fixed slide as referred to hereinabove is indicated at 40 and shown in dotted lines in the drawing. The slide rests upon the ledge 4 against the plate 1 and the upper edge of the slide abuts a rubber insert button 6. The slide is held between lugs 7, 7 on the portion 3 which is part of the back. Inasmuch as there may be some slight differences in the dimensions of the slides and the distance between the lugs 7, the rubber button serves to keep the slide in place and prevent movement thereof across the opening.

At the top the back 1—3 carries a spacer piece 8 with an overhanging lip 9. Below the opening 2 the back carries two movable slide holders 10 and 11 in vertical alinement with the spacer 8. The slide holders have side lugs 14, 14 and 15, 15, respectively. The two movable slides are indicated at 50 and 60 and they rest upon the slide holders between the lugs thereon. The top edges of the slides lie up against the spacer 8 behind the overhang at 9, as will be understood. The distances between the side lugs 14, 14 and 15, 15 are equal and also equal to the distance between the lugs 7, 7 on the back plate. The vertical distance between the upper edges of the slide holders 10, 11 and the spacer 8 is equal to the height of the slides. Thus a vision training outfit comprising many sets of slides may be used without requiring adjustments.

The slide holders are moved in opposite directions an equal distance. Each holder has a threaded bearing 16 and 17, respectively, engaged by a right and left threaded shaft 18 with operating knobs 19, 19. The shaft 18 is supported in a fixed bearing 20 secured to the back plate 1 and is thus held axially immovable. Each holder has also two slots 22, 22 and 23, 23, respectively, which move over guiding screws 26 screwed into the back plate. The bearing 20 has a pointer 25 for indicating the movement of the slides 50 and 60 with reference to a scale 27 on the front slide holder. At the top the back plate is provided with recesses 30 whereby to mount the device on an easel or the like, not shown.

If the slides are to be viewed directly on the device the user holds the back plate with one hand and may then turn the shaft 18 to operate the slides. At the same time he can observe the movements of the slides with reference to the pointer 25. The device is also adapted to be mounted upon a suitable vision training instrument which may have pegs upon which the device may be hung by means of recesses 30.

The device herein disclosed is easy to operate, holds the slides in their proper relation. It is inexpensive to manufacture and is adapted to support transparent slides for vision training purposes.

I claim:

A device of the character described for supporting and operating a three-slide vision training assembly consisting of rectangular slides in superposed relation comprising a back plate having a view opening framed therein, fixed means on said plate engaging the four sides of the rearmost slide of said assembly to support the same in front of and across the said view opening; cooperating fixed and movable means on said back plate engaging the four sides of the other slides in said assembly to support the slides in superposed relation to said rearmost slide, said movable means comprising a pair of superposed slide holders engaging the bottoms and the sides of said other slides, means for slidably securing said slide holders upon the said back plate and means on the latter and on said holders for moving said holders with the slides thereon across the said rearmost slide and across the said view opening said means for moving said holders comprising a threaded lug on each of the holders, a fixed bearing on said back plate, an axially immovable right and left threaded shaft supported in said bearing between the said lugs and threadedly engaging the latter and a hand knob on each end of said shaft for rotating the same from either side of the said device.

HARRY S. ALEXANDER.

REFERENCES CITED

The following references are of record in the file of this patent:

UNITED STATES PATENTS

| Number | Name | Date |
|---|---|---|
| 1,948,901 | Brombach | Feb. 27, 1934 |
| 2,091,173 | Wottring | Aug. 24, 1937 |
| 2,196,906 | Sherman | Apr. 9, 1940 |
| 2,279,904 | Mossman | Apr. 14, 1942 |
| 2,533,347 | Brock | Dec. 12, 1950 |